April 9, 1968   F. A. SHERWOOD   3,377,060
SPRING CONSTRUCTION AND CLAMP LOCATING MEANS THEREFOR
Filed May 2, 1966

INVENTOR.
Frank A. Sherwood
BY
W. F. Wagner
ATTORNEY

United States Patent Office 3,377,060
Patented Apr. 9, 1968

3,377,060
SPRING CONSTRUCTION AND CLAMP
LOCATING MEANS THEREFOR
Frank A. Sherwood, Warren, Mich., assignor to General Motors Corporation, Detroit, Mich., a corporation of Delaware
Filed May 2, 1966, Ser. No. 546,731
7 Claims. (Cl. 267—52)

This invention relates to spring constructions and more particularly to single leaf springs having improved means for locating a wheel carrying axle thereon.

In fabricating leaf springs for use in vehicle suspension, it is common to provide means for locating a clamp intermediate the ends of the spring to which the vehicle axle is rigidly connected. In the past, location of this clamp has been accomplished for example by piercing an aperture vertically through the spring through which a bolt extended into the clamp, or by affixing a lug or button thereon which in turn engaged a depression in the clamp. With the advent of fiberglass reinforced plastic leaf springs, neither of the foregoing alternatives are considered to be completely satisfactory. Thus, in the case of the apertured spring, the elastic qualities are diminished. The formation of a lug, on the other hand, is considerably more difficult in terms of manufacturing than would be the case of a comparable construction in a steel spring.

It is accordingly an object of the present invention to provide a leaf spring construction incorporating an improved axle clamp locating means which, though particularly suited to fiberglass reinforced plastic springs, may also be beneficially utilized in the conventional steel spring.

According to the invention, the spring is fabricated in the usual manner and after fabrication, the opposite side walls thereof are formed with inwardly directed drilled passages or slots which serve to locate an encircling bracket which in turn mechanically cooperates with the usual axle mounting clamp to maintain the axle in a predetermined fixed position longitudinally of the spring body.

In attaining the foregoing objectives, it is a principal feature of the invention to form the locating bracket of reversely similar L-shaped members which are adapted for interlocking surrounding engagement with the body of the spring and include integral lanced portions which cooperatively engage the passages or slots in the spring.

The foregoing and other objects, advantages and features of the invention will become more readily apparent as reference is had to the accompanying specification and sheet of drawings wherein.

Figure 1:
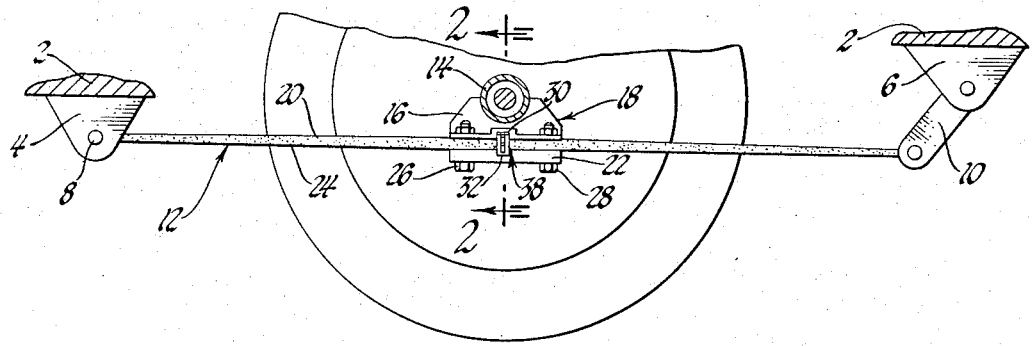
FIGURE 1 is a fragmentary side elevational view, partly in section, of a portion of a vehicle suspension incorporating the invention.

Referring now to the drawing and particularly FIGURE 1, the reference numeral 2 generally designates the sprung mass of a vehicle, which includes forward and rearward brackets 4 and 6 to which are connected respectively by pin joint 8 and shackle 10, the forward and rearward ends of a single leaf spring 12. In the illustrated embodiment, spring 12 is formed of fiberglass reinforced plastic material; however, it will be understood that the invention as hereinafter described may be effectively utilized in corresponding spring configurations formed of steel. In accordance with conventional practice, a wheel carrying axle 14 extends transversely of the vehicle and has each of its lateral opposite ends fixedly secured to the upper portion 16 of a sandwich clamp 18. Upper portion 16 abuts the top surface 20 of spring 12, while the lower portion 22 of the clamp abuts the lower surface 24 of the spring. Bolts 26 and 28 extend through both portions of the clamp laterally outboard of the outer side edge of the spring while corresponding bolts, not shown, similarly connect the inboard side edges of the clamp.

According to one feature of the invention, the longitudinal position of axle 14 is accurately located by forming the upper and lower portions 16 and 22 of the clamp 18 with transverse slots 30 and 32 in which are received the transverse upper and lower wall portions 34 and 36 of a locating bracket 38 arranged in surrounding relation with the body of the spring 12. Bracket 38 in turn is positively located longitudinally of spring 12 by integral inturned tabs 40 and 42 which project into drilled or notched passages 44 and 46 formed vertically midway in the side edges 48 and 50 of spring 12. By utilizing locating passages or notches in the side edges of the spring, minimal alteration of the elastic qualities of the spring occurs and the fatigue life is therefore not materially affected. In addition, processing of the finished spring to accommodate the bracket 38 is relatively simple and economical.

Figure 2:
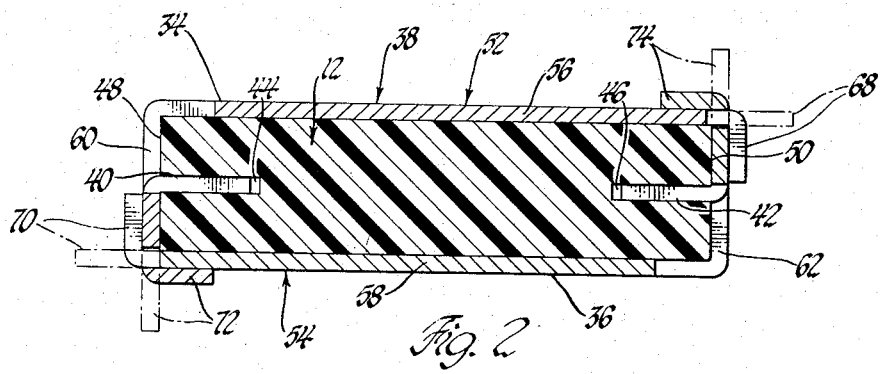
FIGURE 2 is an enlarged sectional end elevation looking in the direction of arrows 2—2 of FIGURE 1.
Figure 3:
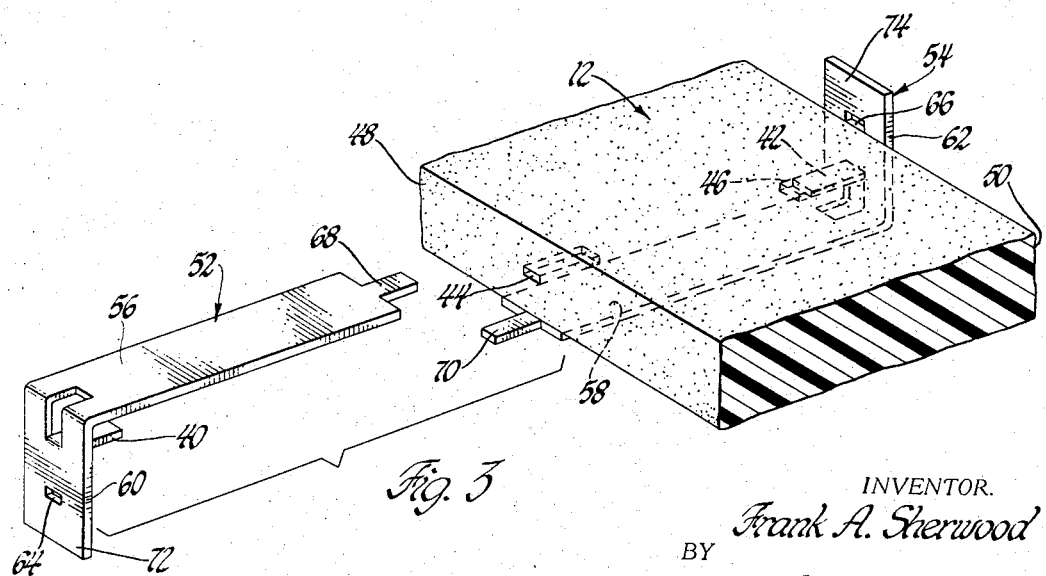
FIGURE 3 is an exploded perspective view illustrating details of construction of the locating bracket and depicting a partially assembled relation of the parts.

According to the principal feature of the invention, locating bracket 38 is formed of identical L-shaped strap elements 52 and 54 which are susceptible to being arranged in reverse relation and thus further increase the economy and efficiency of fabrication and assembly. As seen best in FIGURES 2 and 3, L-shaped elements 52 and 54 are initially formed with long horizontal legs 56 and 58 and short vertical legs 60 and 62, both of which are lanced to provide tabs 40 and 42 struck inwardly from the vertical legs 60 and 62 in parallel relation to the horizontal legs, which, as previously mentioned, extend into the notches or drilled passages 44 and 46 of the spring 12. Additionally, the vertical legs 60 and 62 of each element are formed with apertures 64 and 66 which receive terminal tabs 68 and 70 formed on the ends of legs 56 and 58. Initially, strap elements 52 and 54 are laterally displaced into assembled relation over spring 12 so that the vertical legs thereof engage the side edges of the spring, and tabs 68 and 70 project through apertures 64 and 66. Tabs 68 and 70 are then bent respectively upwardly and downwardly, while the terminal portions 72 and 74 of vertical legs 60 and 62 are bent laterally inwardly to establish permanent interlocking engagement between the two L-shaped elements. When thus assembled, bracket 38 is in turn mechanically locked to the body of the spring 12 by the inwardly projecting tabs 40 and 42 occupying notches 44 and 46.

While the single embodiment of the invention has been shown in relation to a single leaf spring, it will be apparent that it is equally adaptable to multi-leaf springs merely by forming the vertical legs of greater length and with multiple tabs 40 and 42. It is, therefore, to be understood that it is not intended to limit the invention to the embodiment shown, but only by the scope of the claims which follow.

I claim:

1. A spring assembly comprising, a leaf spring having laterally directed passages extending inwardly of each side edge thereof, a pair of transversely extending interlocking strap members embracing said spring and having integral tabs formed thereon projecting into said passages, and a sandwich clamp structure overlying said spring having transverse recesses formed therein mating with said strap members.

2. The structure set forth in claim 1 wherein said spring is formed of fiberglass reinforced plastic.

3. The structure set forth in claim 1 wherein said laterally directed passages are axially aligned.

4. The structure set forth in claim 1 wherein said strap members are reversely identical.

5. An interlocking bracket for a leaf spring comprising, a pair of identical L-shaped straps arranged in vertical and horizontal reverse relation, each having a tab portion formed at one end thereof and an aperture formed near the other end thereof, the tab on each strap extending into the aperture of the other strap, and a lanced portion bent down from one leg of each strap in parallel relation with the other leg thereof.

6. The structure set forth in claim 5 wherein each L-shaped strap includes a long transverse portion and a short vertical portion and the apertures are formed in said vertical portion a distance from the plane of said transverse portion equal to the thickness of the leaf spring.

7. The structure set forth in claim 6 wherein said tabs are bent down in abutting relation with the vertical portion of said strap and the portion of said vertical portion between said apertures and the ends thereof are bent down in abutting relation with the transverse portions of said straps.

References Cited

UNITED STATES PATENTS 1,195,460   9/1916   Gramlich _____ 267—47

ARTHUR L. LA POINT, *Primary Examiner.*

R. M. WOHLFARTH, *Assistant Examiner.*